United States Patent
Takenaka

(10) Patent No.: US 12,263,712 B2
(45) Date of Patent: Apr. 1, 2025

(54) WHEEL-SIDE DEVICE AND SUSPENSION DEVICE

(71) Applicant: TOYOTA JIDOSHA KABUSHIKI KAISHA, Toyota (JP)

(72) Inventor: Hidehiro Takenaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/615,425

(22) Filed: Mar. 25, 2024

(65) Prior Publication Data

US 2024/0336099 A1 Oct. 10, 2024

(30) Foreign Application Priority Data

Apr. 10, 2023 (JP) ................. 2023-063302

(51) Int. Cl.
*B60G 7/00* (2006.01)
*B60G 3/14* (2006.01)
*B62D 7/18* (2006.01)

(52) U.S. Cl.
CPC .............. *B60G 7/001* (2013.01); *B60G 3/14* (2013.01); *B62D 7/18* (2013.01); *B60G 2200/13* (2013.01); *B60G 2200/44* (2013.01); *B60G 2204/182* (2013.01); *B60G 2206/124* (2013.01); *B60G 2206/50* (2013.01); *B60G 2300/50* (2013.01); *B60L 2220/46* (2013.01); *B60Y 2200/91* (2013.01)

(58) Field of Classification Search
CPC ...... B60G 7/001; B60G 7/00; B60G 2200/44; B60G 2200/13; B60G 2300/50; B60G 2300/132; B60G 2300/1322; B60G 2300/1324; B60G 2204/182; B60G 2206/10; B60G 2206/124; B60G 2206/50; B60G 2206/011; B60G 2206/0144; B60G 3/02; B60G 3/12; B60G 3/14; B62D 7/18; B60K 7/0007; B60K 7/07; B60K 7/00; B60K 2007/0061; B60K 17/043; B60K 17/306; B60L 2220/46; B60Y 2200/91
USPC ..... 280/124.1, 124.128, 124.133; 180/65.51, 180/252, 253, 65.1
See application file for complete search history.

(56) References Cited

U.S. PATENT DOCUMENTS 4,606,429 A * 8/1986 Kurata ................. B62D 61/065
                                                          180/382
2011/0109052 A1   5/2011 Hatzikakidis
(Continued)

FOREIGN PATENT DOCUMENTS

DE  102008031057 A1 *  2/2009  ............. B60F 1/043
JP      2004338545 A *  12/2004  ........... B60K 7/0007
(Continued)

*Primary Examiner* — Keith J Frisby
(74) *Attorney, Agent, or Firm* — Sughrue Mion, PLLC

(57) ABSTRACT

A wheel-side device provided for each of a plurality of wheels of a vehicle includes: a drive mechanism provided on a suspension arm connecting a wheel support member that supports the wheel and a body-side member of the vehicle and including a drive actuator, an output shaft of the drive actuator being connected to the wheel via a constant velocity joint to rotationally drive the wheel; and a steering actuator provided between the suspension arm and the wheel support member without a link member interposed therebetween and configured to steer the wheel.

9 Claims, 6 Drawing Sheets

(56) References Cited

U.S. PATENT DOCUMENTS

| | | |
|---|---|---|
| 2020/0223478 A1 | 7/2020 | Sano |
| 2024/0227484 A9* | 7/2024 | Zona .................... B60G 11/183 |

FOREIGN PATENT DOCUMENTS

| | | |
|---|---|---|
| JP | 2011-525876 A | 9/2011 |
| JP | 2020-111270 A | 7/2020 |

* cited by examiner

WHEEL-SIDE DEVICE AND SUSPENSION DEVICE

REFERENCE TO RELATED APPLICATIONS

This application claims priority from Japanese Patent Application No. 2023-063302 filed on Apr. 10, 2023. The entire content of the priority application is incorporated herein by reference.

TECHNICAL FIELD

The following disclosure relates to a wheel-side device provided for a wheel and a suspension device.

BACKGROUND ART

In a wheel-side device described in Patent Application Publication No. 2020-111270 A (JP 2020-111270 A), a steering actuator is provided on a suspension arm, and an output shaft of the steering actuator is connected via a link member to a wheel support member that supports a wheel. A drive actuator is provided on the wheel support member.

In a wheel-side device described in Japanese Patent Application Publication No. 2011-525876 A (JP 2011-525876 A), a suspension arm is provided with a drive actuator and a steering actuator (FIG. 16, paragraph [0011], etc.). An output shaft of the drive actuator is connected to a wheel via a belt (FIG. 13, paragraph [0018], etc.).

SUMMARY

One aspect of the present disclosure relates to an improvement in a wheel-side device provided for a wheel and a suspension device, such as facilitating wiring, piping, etc., for the drive actuator.

In a wheel-side device and a suspension device according to the present disclosure, a drive mechanism is provided on a suspension arm. The drive mechanism includes a drive actuator, and an output shaft of the drive actuator is connected to a wheel via a constant velocity joint.

Since the drive mechanism is provided on the suspension arm as described above, wiring, piping (cooling piping), etc., for the drive actuator is facilitated as compared with a case where the drive mechanism is provided on a wheel support member. Further, since the drive mechanism does not include a belt, maintenance is facilitated.

BRIEF DESCRIPTION OF DRAWINGS

The objects, features, advantages, and technical and industrial significance of the present disclosure will be better understood by reading the following detailed description of embodiments, when considered in connection with the accompanying drawings, in which.

DESCRIPTION

Figure 2:
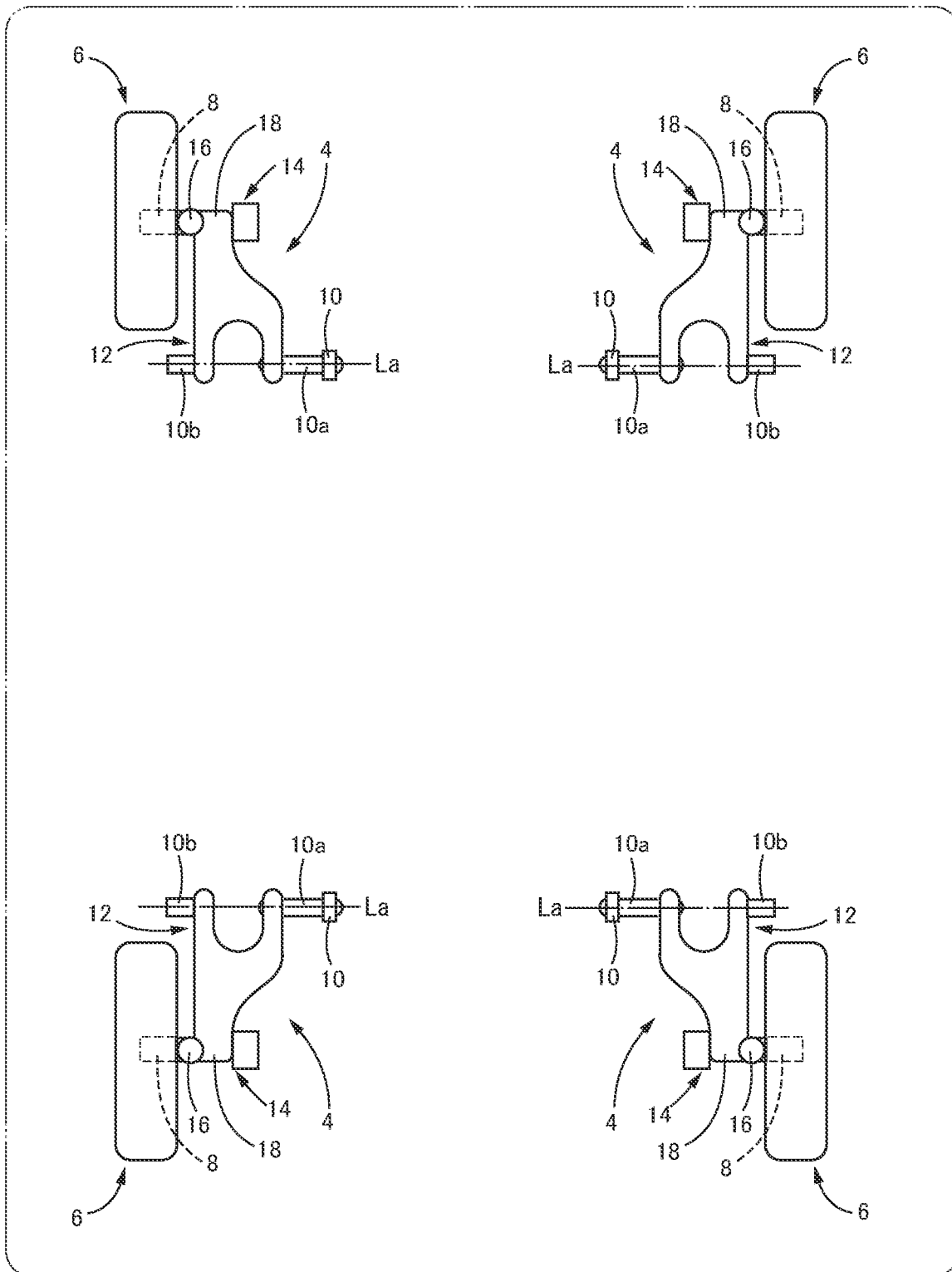
FIG. 2 is a conceptual view of a vehicle including the wheel-side device.
Figure 3:
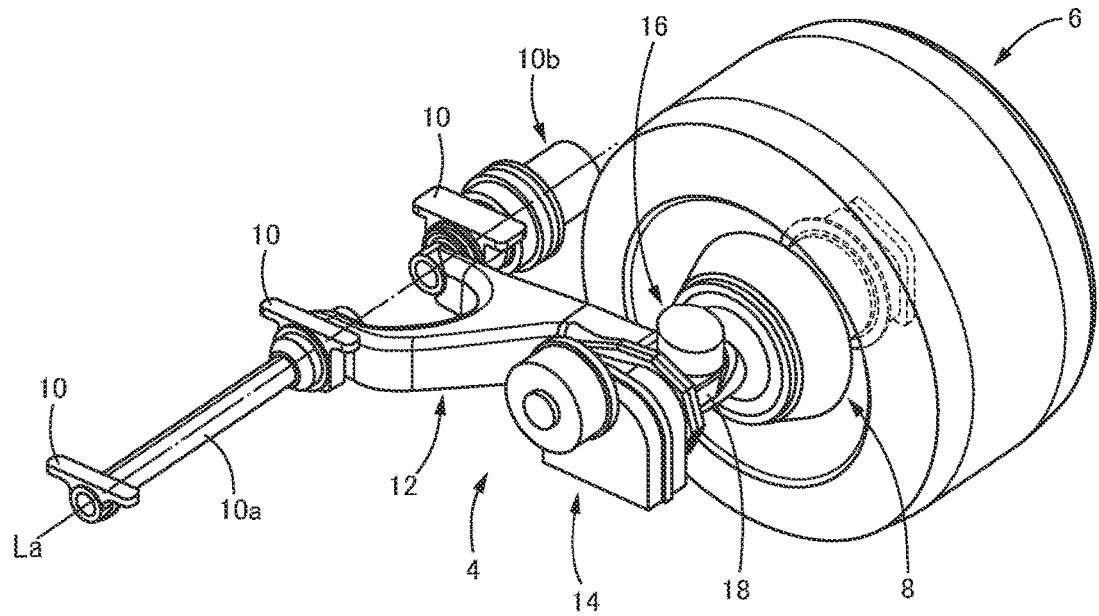
FIG. 3 is a perspective view conceptually illustrating a wheel and components around the wheel including the wheel-side device.

There will be hereinafter described a wheel-side device according to one embodiment of the present disclosure with reference to the drawings. As illustrated in FIGS. 2 and 3, four wheel-side devices 4 are provided so as to respectively correspond to a plurality of wheels 6 (here, four wheels 6) of a vehicle. Each of the wheel-side devices 4 includes: a drive mechanism 14 provided on a suspension arm 12 connecting a knuckle 8 that functions as a wheel support member supporting the wheel 6 and a body-side member 10 of the vehicle; and a steering actuator (steering mechanism) 16 provided between the suspension arm 12 and the knuckle 8. In the present embodiment, since the wheel-side devices 4 are provided so as to correspond to the respective wheels 6, the wheels 6 can be independently rotationally driven and steered. In other words, each of the plurality of wheels 6 is a drive wheel and a steerable wheel.

The suspension arm 12 of the present vehicle may be a leading arm for the front wheel and a trailing arm for the rear wheel, as illustrated in FIG. 2.

The vehicle may be, for example, a planetary explorer vehicle or an ordinary vehicle that travels on a general road on the earth.

First Embodiment 1

In the wheel-side device 4, the suspension arm 12, which is provided with the drive mechanism 14, has a generally A-shape. A bifurcated portion of the suspension arm 12, which is one end portion thereof, is held by the body-side member 10 so as to be swingable about an axis La extending generally in a width direction of the vehicle. A top portion 18 of the suspension arm 12, which is the other end portion thereof, is connected to the knuckle 8 so as to be rotatable relative to the knuckle 8 about an axis Lb (FIGS. 1, 5, etc.) extending generally in an up-down direction.

At the one end portion of the suspension arm 12, one part of the bifurcated portion is connected to one end of a torsion bar 10a so as to be rotatable integrally with the one end of the torsion bar 10a. The other end of the torsion bar 10a is fixedly attached to the body-side member 10. The torsion bar 10a is twisted by the swinging of the suspension arm 12, and an elastic force (spring reaction force) based on the twisting of the torsion bar 10a is generated.

The other part of the bifurcated portion is connected to a shock absorber 10b, and the swinging of the suspension arm 12 is damped by the shock absorber 10b.

The shock absorber 10b may include, for example, an electric motor. A main body of the shock absorber 10b may be fixed to the body-side member 10, and an output shaft of the electric motor may be connected to the suspension arm 12. The swinging of the suspension arm 12 causes the output shaft of the electric motor to be rotated, and the electric motor acts as a generator to generate an induced electromotive force proportional to the rotational speed, that is, a damping force.

Figure 1:
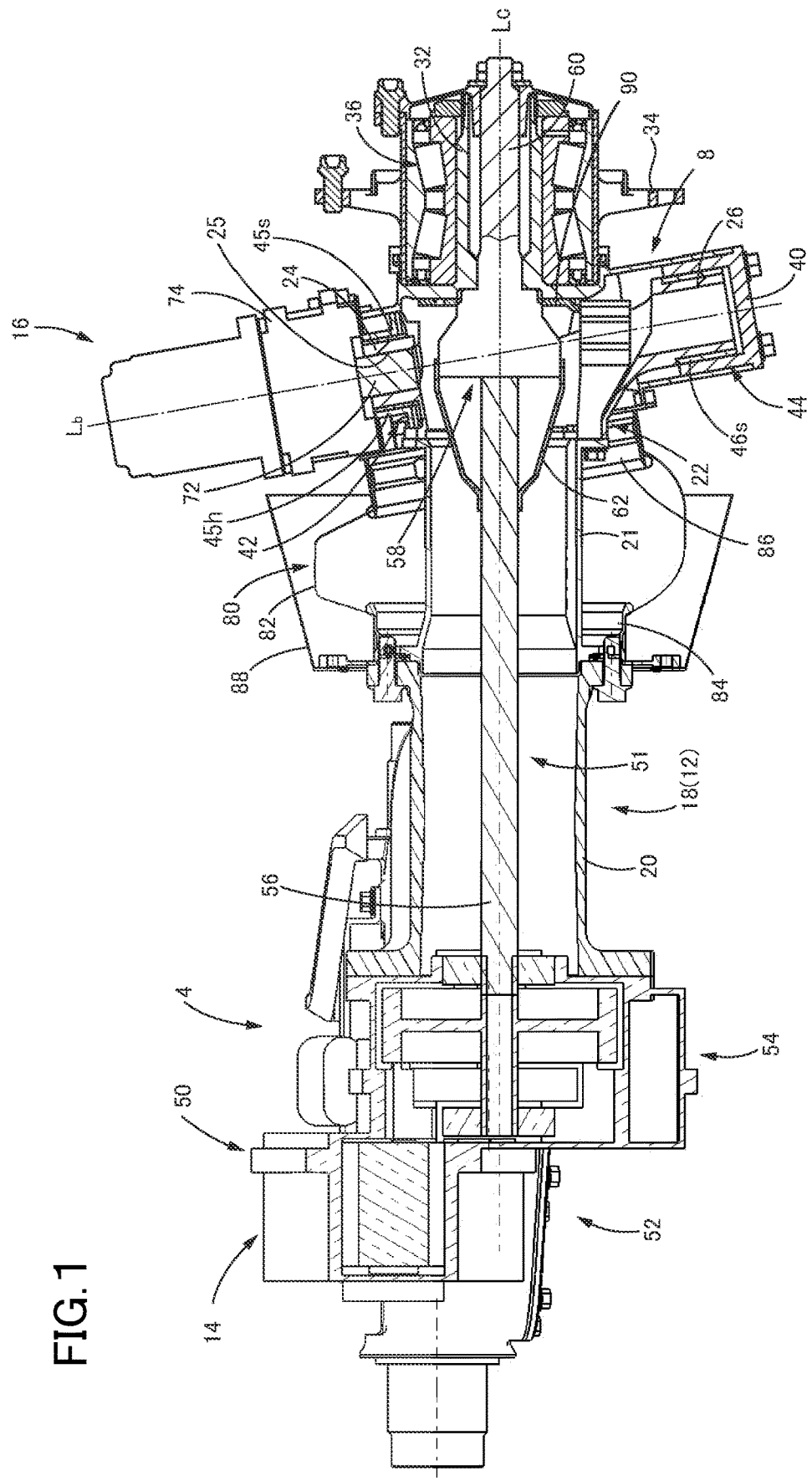
FIG. 1 is a cross-sectional view of a wheel-side device according to a first embodiment of the present disclosure.
Figure 4:
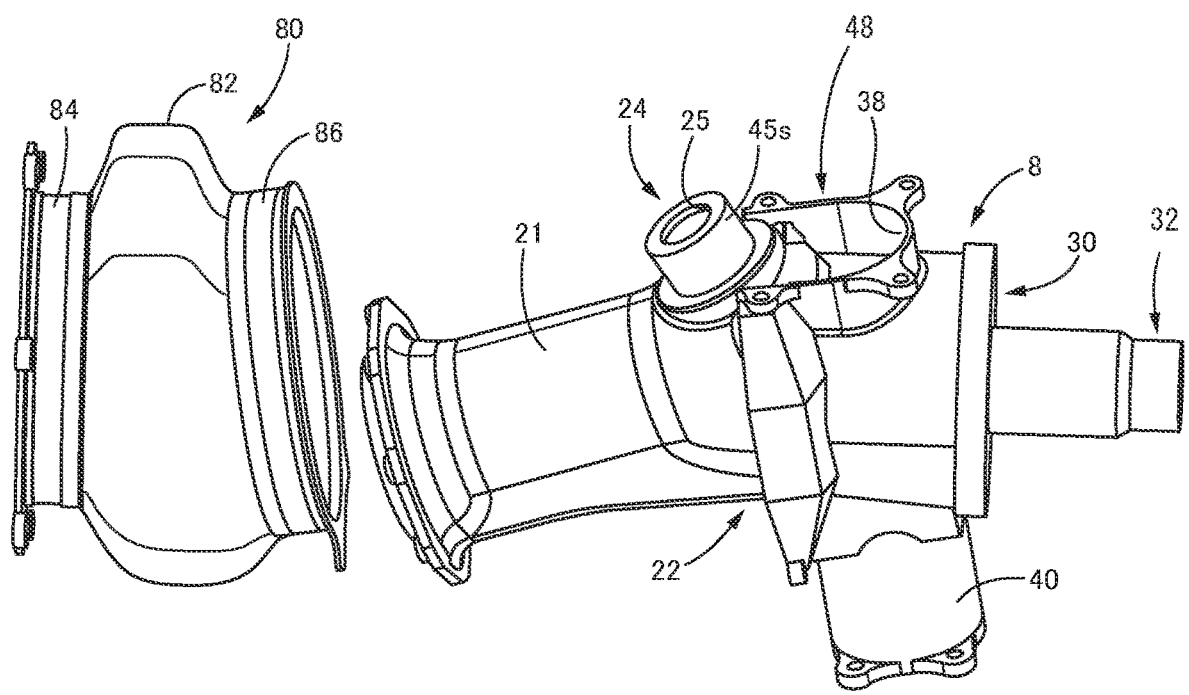
FIG. 4 is a view conceptually illustrating a part of a suspension arm of the wheel-side device.
Figure 5:
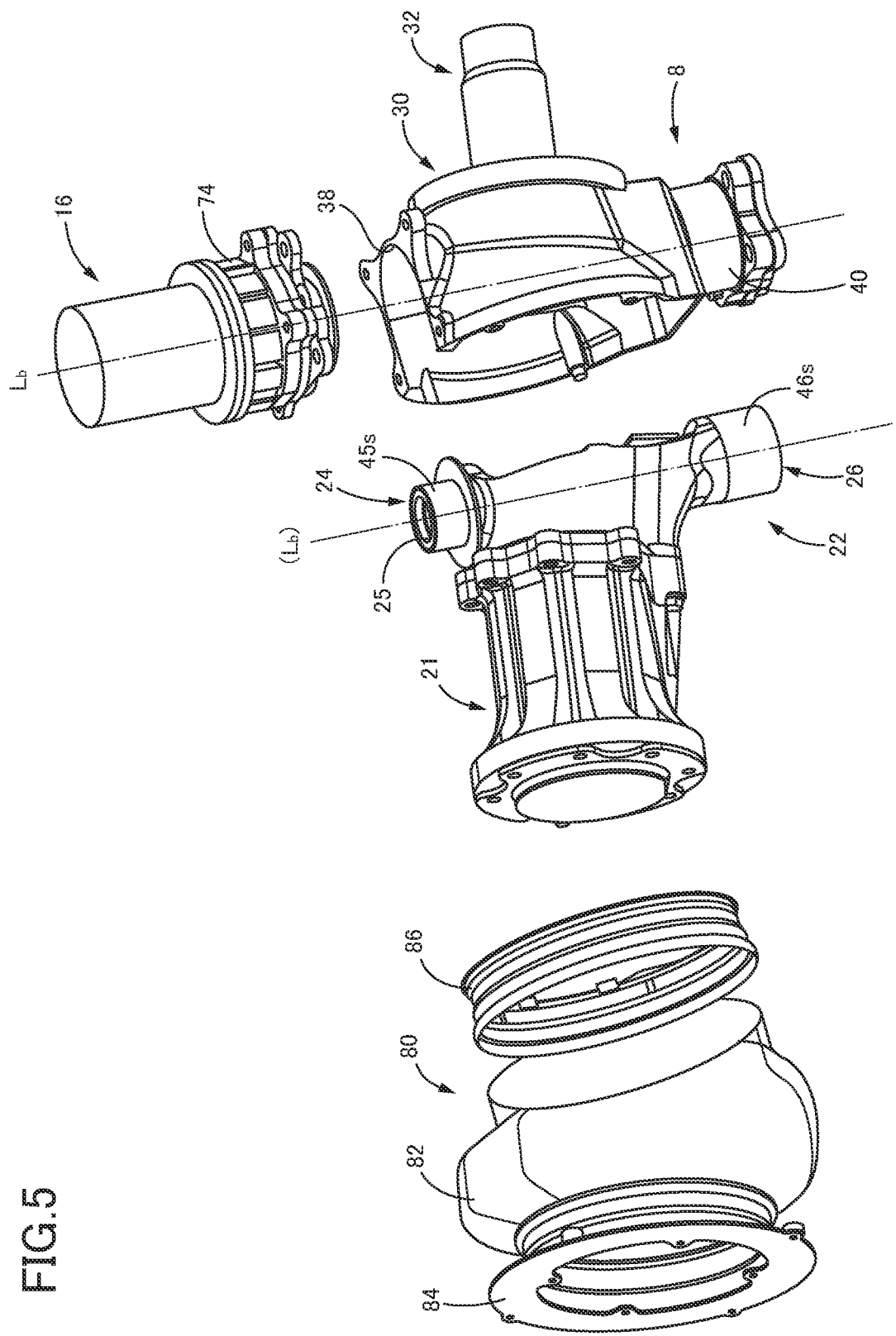
FIG. 5 is an exploded perspective view (part) of the suspension arm and a steering actuator of the wheel-side device.

As illustrated in FIGS. 1, 4, and 5, the suspension arm 12 includes, at the top portion 18 thereof, a first housing 20, a second housing 21, and a third housing 22 connected in series. The third housing 22 is located closest to the wheel among the first through third housings 20, 21, and 22. Therefore, the third housing 22 may be referred to as a wheel-side end portion of the suspension arm 12.

At an upper portion of the third housing 22, a protrusion 24 functioning as a first protruding portion is provided so as to extend generally in the up-down direction. The protrusion 24 includes a fitting recess (fitting hole) 25. At a lower portion of the third housing 22, an engagement protrusion 26 functioning as a second protrusion is provided so as to protrude downward. The engagement protrusion 26 has a generally cylindrical shape. The protrusion 24 and the engagement protrusion 26 are located on the same axis Lb extending generally in the up-down direction and have respective shapes extending along the same axis Lb.

The knuckle 8 includes a main body portion 30 and a wheel holding portion 32 that rotatably holds the wheel 6. A rotation shaft 60 rotated by the drive mechanism 14 is held by the wheel holding portion 32 via a hub bearing 36 so as to be rotatable relative to the wheel holding portion 32 about the rotation center line of the wheel 6. The rotation shaft 60 is attached to a wheel hub (hub) 34 so as to be rotatable integrally with the wheel hub 34. A disk wheel (not illustrated) is attached to the wheel hub 34 so as to be rotatable integrally with the wheel hub 34.

A cutout 38 having a generally circular shape is formed in an upper portion of the main body portion 30. The cutout 38 is open on its one of opposite sides closer to the suspension arm 12 (that is opposite to the other side closer to the wheel 6). At a lower portion of the main body portion 30, a holding portion 40 having an engagement recess is provided so as to protrude downward. The engagement recess has a shape engageable with the engagement protrusion 26 of the suspension arm 12. The cutout 38 and the holding portion 40 are located on the same axis Lb extending generally in the up-down direction.

The suspension arm 12 and the knuckle 8 are connected to each other via slide bearings 42 and 44 so as to be rotatable relative to each other about the axis Lb extending in the up-down direction. Specifically, the engagement protrusion 26 protruding downward of the suspension arm 12 is held by an inner circumferential portion (the engagement recess) of the holding portion 40 of the knuckle 8, and the protrusion 24 of the suspension arm 12 is fitted in the cutout 38 of the knuckle 8. Further, the slide bearing 42 is disposed between the protrusion 24 of the suspension arm 12 and the knuckle 8, and the slide bearing 44 is disposed between the engagement protrusion 26 of the suspension arm 12 and the holding portion 40 of the knuckle 8.

The slide bearing 42 includes a low friction member 45s fitted to an outer circumferential portion of the protrusion 24 and a housing 45h fixed to the knuckle 8. The slide bearing 44 includes a low friction member 46s fitted to an outer circumferential portion of the engagement protrusion 26. In the slide bearing 44, the engagement recess of the holding portion 40 functions as a housing of the slide bearing 44. The suspension arm 12 and the knuckle 8 are connected to each other by the slide bearings 42 and 44 so as to be rotatable relative to each other about the axis Lb. Further, at a connecting portion 48 between the suspension arm 12 and the knuckle 8, a part of the suspension arm 12 (the third housing 22) and a part of the knuckle 8 (the main body portion 30) are superposed on each other.

The drive mechanism 14 rotationally drives the wheel 6 and includes a drive actuator 50 and a transmission portion 51 that transmits a driving force of the drive actuator 50 to the rotation shaft 60 of the wheel 6. The drive actuator 50 includes an electric motor 52 and a speed reducer 54. The transmission portion 51 includes, for instance, a drive shaft 56 that is an output shaft of the drive actuator 50, i.e., an output shaft of the speed reducer 54, and a constant velocity joint 58.

The drive actuator 50 is attached to an end (the first housing 20) of the top portion 18 of the suspension arm 12 opposite to the wheel 6. The drive shaft 56 extends from the first housing 20 to the third housing 22 and is connected to the rotation shaft 60 of the wheel 6 via the constant velocity joint (CVJ) 58 in the third housing 22. The constant velocity joint 58 is a joint that transmits the torque of the input shaft (drive shaft) 56 to the output shaft 60 (rotation shaft) so that the input shaft 56 and the output shaft 60 rotate at the same speed even if they are not located on one line. The constant velocity joint 58 is located inside the connecting portion 48 where the third housing 22 of the suspension arm 12 and the main body portion 30 of the knuckle 8 are superposed on and connected to each other.

Thus, the drive actuator 50 is attached to the suspension arm 12, and the transmission portion 51 is located inside the suspension arm 12. The drive mechanism 14 is provided integrally with the suspension arm 12.

A grease boot 62 as a cover is attached to the periphery (input side, open side) of the constant velocity joint 58 via a seal. The grease boot 62 suppresses vaporization (evaporation) of grease used in the constant velocity joint 58.

The steering actuator (steering mechanism) 16 is attached to the connecting portion 48 between the suspension arm 12 and the knuckle 8. The steering actuator 16 includes an electric motor and a speed reducer, and an output shaft of the steering actuator 16, i.e., an output shaft of a speed reducer 72, is fitted in the fitting recess 25 of the protrusion 24 of the suspension arm 12 so as to be rotatable integrally with the fitting recess 25. A main body 74 of the steering actuator 16 is attached to the knuckle 8 or the housing 45h of the slide bearing 42 so as to be rotatable integrally with the knuckle 8 or the housing 45h. Since the suspension arm 12 is held by the body-side member 10 so as not to be rotatable about the axis Lb, the knuckle 8 is rotated with respect to the suspension arm 12 by the rotation of the steering actuator 16, and the wheel 6 is steered. The knuckle 8 is rotated with respect to the drive shaft 56 of the drive actuator 50. As described above, since the steering actuator 16 is provided at the connecting portion 48 between the suspension arm 12 and the knuckle 8, the wheel 6 can be steered without a link member. Thus, it can be considered that the steering actuator 16, etc., constitute a steering mechanism.

Further, since the wheel 6 is steered about the axis Lb, the axis Lb can be referred to as a steering axis (kingpin axis).

As described above, since the rotation shaft 60 is held by the wheel holding portion 32 of the knuckle 8 so as to be rotatable relative to the wheel holding portion 32 about the rotation center line of the wheel 6, the constant velocity joint 58 is located on the rotation center axis Le of the wheel 6. The axis Lb passes through the constant velocity joint 58. The knuckle 8 is rotated about the axis Lb with respect to the suspension arm 12, and the wheel 6 is steered about the axis Lb that intersects the rotation center axis Le of the wheel 6. Therefore, the wheel 6 can be smoothly steered by the steering actuator 16. Further, since the axis Lb is located near the wheel 6 as illustrated in FIG. 1, a point of intersection between the axis Lb and the road surface can be brought close to the ground contact center of the wheel 6. It is thus possible to reduce energy required for the steering actuator 16 when steering the wheel 6.

A dust boot 80 is provided between the suspension arm 12 and the knuckle 8. The dust boot 80 includes a boot body 82 and a pair of retainers 84, 86 located on opposite sides of the boot body 82. The retainer 84 is attached to the suspension arm 12, and the retainer 86 is attached to the knuckle 8. A boot cover 88 is attached to an outside of the dust boot 80.

The dust boot 80 and the boot cover 88 favorably prevent entry of dust into an interior when the suspension arm 12 and the knuckle 8 are rotated relative to each other.

Figure 6:
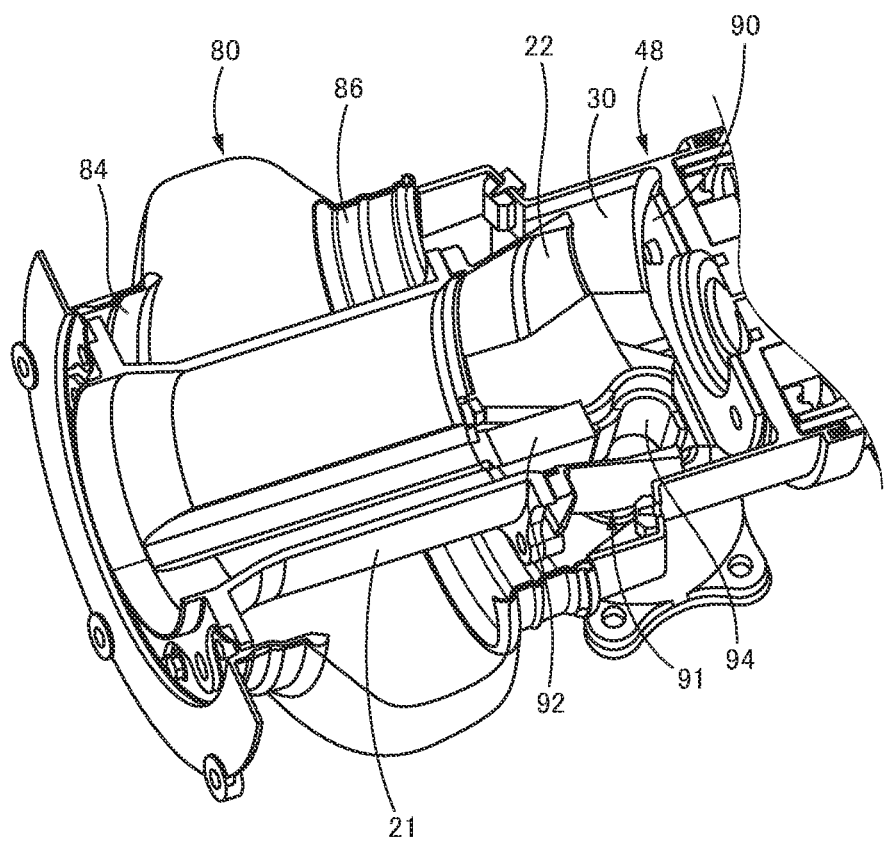
FIG. 6 is a perspective view conceptually illustrating a connecting portion between the suspension arm and the wheel support member.

As illustrated in FIGS. 1 and 6, a thermal plate 90 is provided between the body portion 30 of the knuckle 8 and the wheel holding portion 32. The thermal plate 90 is for heating the hub bearing 36, and heat received by the thermal plate 90 is transferred to the hub bearing 36, etc. The third housing 22 of the suspension arm 12 is provided with a heat transfer portion 91 that transfers heat of the second housing 21 of the suspension arm 12 to the thermal plate 90.

The drive actuator 50 is attached to the first housing 20, and the drive actuator 50 generates heat by being operated. Accordingly, the first housing 20 is heated and functions as a high-temperature portion.

However, since the materials of the first, second, and third housings 20, 21, and 22 of the suspension arm 12 are determined based on rigidity required for the suspension arm 12, all of the first through third housings 20, 21, and 22 are not always made of a material having a high heat transfer coefficient. In the present embodiment, the second housing 21 is made of a material having a high heat transfer coefficient whereas the third housing 22 is made of a material having a low heat transfer coefficient. Accordingly, heat of the first housing 20 is favorably transferred to the second housing 21, but heat of the second housing 21 is not likely to be favorably transferred to the third housing 22. In the present embodiment, therefore, the third housing 22 is provided with the heat transfer portion 91 as a heating portion.

The heat transfer portion 91 includes a plurality of heat transfer members 92 and 94 disposed side by side. The heat transfer members 92 and 94 are made of a material having a high heat conductivity (for example, copper). The heat transfer member 92 may be in the form of a plate, a block, or the like that is not easily deformed. The heat transfer member 94 may be in the form of a sheet having flexibility. The heat transfer member 94 may be, for example, a net-like copper wire (flat-braided copper wire).

One end of the heat transfer member 92 is in contact with the second housing 21, and the other end thereof is in contact with the heat transfer member 94. One end of the heat transfer member 94 is in contact with the heat transfer member 92, and the other end thereof is in contact with the thermal plate 90. Since the heat transfer member 94 has flexibility, the heat transfer member 94 is deformable by the relative rotation of the suspension arm 12 and the knuckle 8. As a result, even when the suspension arm 12 and the knuckle 8 rotate relative to each other, heat of the second housing 21 can be favorably transferred to the thermal plate 90.

Since the operation of the drive actuator 50 is controlled by a control device (not illustrated) mainly constituted by a computer, heat generation by the operation of the drive actuator 50 is also controlled. Therefore, the first housing 20 is stably and favorably heated.

In the wheel-side device configured as described above, the drive shaft 56 is rotated by the operation of the drive actuator 50, and the wheel 6 is rotated. Further, the wheel 6 is steered about the kingpin axis Lb by the operation of the steering actuator 16. The drive mechanisms 14, the steering actuators 16, etc., provided on the respective suspension arms 12 can rotationally drive and steer the corresponding wheels 6, which are drive wheels and steerable wheels, separately and independently of each other.

Since the drive mechanism 14 is provided integrally with the suspension arm 12 that does not move in association with steering of the wheel 6, wiring, piping, etc., for the drive actuator 50 are facilitated. In other words, it is possible to use a material having high resistance to temperature, vacuum, and radiation and having low flexibility, for wiring and piping. It is thus possible to favorably protect the power supply line, the signal line, the cooling water pipe, and the like from an outside environment.

Further, the number of members exposed to the outside of the suspension arm 12 and the knuckle 8 is small, that is, a belt and a link member are unnecessary. Therefore, it is possible to suppress deterioration of the members due to contact of the belt, the link member, etc., with the outside air, thus facilitating maintenance. In other words, the wheel-side device 4 can be used in a harsh environment such as a vacuum, a high radiation dose, a high temperature, and a low temperature.

The constant velocity joint 58 is located inside the connecting portion 48 between a part of the suspension arm 12 and a part of the knuckle 8, thus enabling the constant velocity joint 58 to be used in a stable atmosphere well shielded from the outside air. Accordingly, grease used in the constant velocity joint 58 is stabilized, and the constant velocity joint 58 is stably operated. Some types of grease have a predetermined usable temperature range, some types of grease change in characteristics when exposed to radiation, and some types of grease easily vaporize. However, since the constant velocity joint 58 is used in a stable atmosphere, grease can be stabilized. In other words, it is possible to widen a range of selection of grease used for the constant velocity joint 58.

Owing to the thermal plate 90, heat of the drive actuator 50 is favorably transferred to the hub bearing 36. This prevents a decrease in the temperature of grease of the hub bearing 36 even in a low-temperature environment. The hub bearing 36 is not likely to become inoperable due to a decrease in the temperature of grease, thus making it possible to favorably operate the hub bearing 36.

The drive mechanism 14 is provided on the suspension arm 12, and the steering actuator 16 is provided between the suspension arm 12 and the knuckle 8. This enables the wheel-side device 4 to be constructed in a compact unit, leading to an improvement in versatility of the wheel-side device 4.

In the present embodiment, the wheel-side device 4 may include the drive mechanism 14 and the steering actuator 16 or may include the suspension arm 12 and the knuckle 8 in addition to the drive mechanism 14 and the steering actuator 16. The suspension device may include the suspension arm 12 provided with the drive mechanism 14.

In the embodiment illustrated above, the wheel-side device 4 is provided on the wheel of the vehicle having a leading-arm suspension or a trailing-arm suspension. However, the suspension may be of any type.

The number of the wheels 6 of the vehicle may be four or more.

Further, a heater or the like for directly heating the thermal plate 90 may be provided instead of the heat transfer portion 91. The temperature of the hub bearing 36 can be adjusted by heating the thermal plate 90 with the heater.

The transmission members 92 and 94 may have any shape.

Second Embodiment

Figure 7:
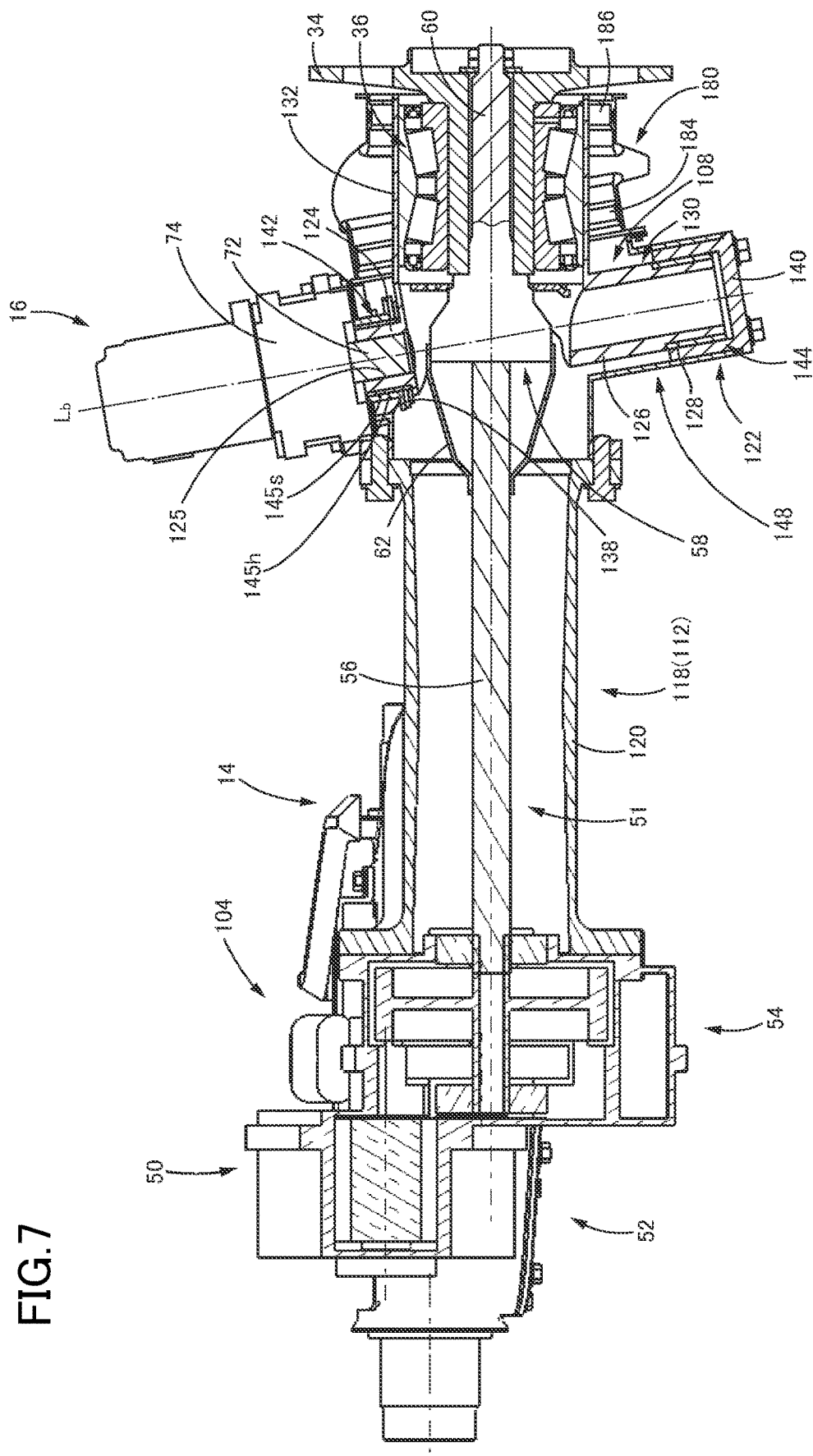
FIG. 7 is a cross-sectional view of a wheel-side device according to a second embodiment of the present disclosure.

In the first embodiment, the output shaft 72 of the steering actuator 16 is connected to the suspension arm 12 so as to be rotatable integrally with the suspension arm 12, and the main body 74 of the steering actuator 16 is connected to the knuckle 8 so as to be rotatable integrally with the knuckle 8. In the second embodiment, in contrast, the main body 74 of the steering actuator 16 is attached to a suspension arm 112 so as to be rotatable integrally with the suspension arm 112, and the output shaft 72 of the steering actuator 16 is attached to a knuckle 108 so as to be rotatable integrally with the knuckle 108. One example of this configuration is illustrated in FIG. 7. The same reference members as used in the first embodiment are used to identify the corresponding components, and description thereof is omitted.

As illustrated in FIG. 7, the suspension arm 112 includes, at a top portion 118 thereof, a first housing 120 and a third housing 122. A generally circular cutout 138 is formed in an upper portion of the third housing 122. The cutout 138 has an opening on one of its opposite sides closer to the wheel. A holding portion 140 having an engagement recess is provided at a lower portion of the third housing 122 so as to extend downward. A protrusion 124 in which a fitting recess 125 is formed is provided at an upper portion of a main body portion 130 of the knuckle 108, and an engagement protrusion 126, which is a cylindrical protrusion, is provided at a lower portion of the main body portion 130 of the knuckle 108.

The protrusion portion 124 of the knuckle 108 is attached to the cutout 138 of the suspension arm 112 via a slide bearing 142, and the engagement protrusion 126 of the knuckle 108 is engaged with the engagement recess of the holding portion 140 of the suspension arm 112 via a slide bearing 144. Thus, the suspension arm 112 and the knuckle 108 are superposed on and connected to each other so as to be rotatable relative to each other about the axis Lb.

The output shaft 72 of the steering actuator 16 is fitted in the fitting recess 125 of the protrusion 124 of the knuckle 108 so as to be rotatable integrally with the fitting recess 125. The main body 74 of the steering actuator 16 is attached to the periphery of the cutout 138 of the suspension arm 112 or a housing 145h (fixed to the suspension arm 112) of the slide bearing 142 so as to be rotatable integrally with the cutout 138 or the housing 145h. The constant velocity joint 58 connected to the drive shaft 56 of the drive actuator 50 is located inside a connecting portion 148 where the suspension arm 112 and the knuckle 108 are superposed on and connected to each other.

Radially inward of the wheel holding portion 132 of the knuckle 108, the rotation shaft 60 is held via the hub bearing 36 so as to be rotatable relative to the wheel holding portion 132. The wheel hub 34 is engaged with the rotation shaft 60 so as to be rotatable integrally with the rotation shaft 60.

Further, a dust boot 180 is disposed between the knuckle 108 and the suspension arm 112. One retainer 184 of the dust boot 180 is attached to the suspension arm 12, and the other retainer 186 is attached to the knuckle 108.

Also in the wheel-side device 104 configured as described above, wiring and piping for the drive actuator 50 is facilitated, as in the wheel-side device 4 of the first embodiment, thus facilitating maintenance. Further, the wheel-side device 104 can be used even in a harsh environment and can be compactly unitized.

The present disclosure is embodied with various changes and modifications based on the knowledge of those skilled in the art. For instance, each of the suspension arm and the knuckle may have any suitable configuration and shape.

Claimable Invention

Hereinafter, various forms of the claimable invention will be briefly described.

(1) A wheel-side device provided for each of a plurality of wheels of a vehicle, including: a drive mechanism provided on a suspension arm connecting a wheel support member that supports the wheel and a body-side member of the vehicle and including a drive actuator, an output shaft of the drive actuator being connected to the wheel via a constant velocity joint to rotationally drive the wheel; and a steering actuator provided between the suspension arm and the wheel support member without a link member interposed therebetween and configured to steer the wheel.

In a case where the drive mechanism includes the drive actuator and the transmission portion that transmits the driving force of the drive actuator to the wheel, the transmission portion may be provided inside the suspension arm.

(2) The wheel-side device according to the form (1), wherein a part of the suspension arm and a part of the wheel support member are superposed on and connected to each other so as to be rotatable relative to each other about an axis extending generally in an up-down direction; and wherein the constant velocity joint is located inside a connecting portion which is a portion where the part of the suspension arm and the part of the wheel support member are superposed on and connected to each other.

(3) The wheel-side device according to the form (1) or (2), wherein an output shaft of the steering actuator is attached to one of the suspension arm and the wheel support member so as to be rotatable integrally with the one of the suspension arm and the wheel support member, and wherein a main body of the steering actuator is attached to the other of the suspension arm and the wheel support member so as to be rotatable integrally with the other of the suspension arm and the wheel support member.

The steering actuator is provided between the suspension arm and the wheel support member in a state in which the output shaft of the steering actuator extends on the axis extending generally in the up-down direction. Since the suspension arm is unrotatable about the axis extending generally in the up-down direction, the wheel support member rotates about the axis with respect to the suspension arm by the operation of the steering actuator, and the wheel is steered.

(4) The wheel-side device according to any one of the forms (1)-(3), wherein one of the suspension arm and the wheel support member includes a first protruding portion having a fitting recess and a second protruding portion located on an axis passing through the first protruding portion and extending generally in an up-down direction, and wherein the other of the suspension arm and the wheel support member includes: a cutout having a generally circular shape; and a holding portion having an engagement recess located on an axis passing through the cutout and extending generally in the up-down direction, the engagement recess being engageable with the second protruding portion.

(5) The wheel-side device according to the form (4), wherein the first protruding portion, the second protruding portion, and the holding portion extend along the same axis.

(6) The wheel-side device according to the form (5), wherein, in a state in which the second protruding portion is held by the holding portion while engaged with the engagement recess and the first protruding portion is fitted in the cutout, the suspension arm and the wheel support member are connected so as to be rotatable relative to each other about the axis extending generally in the up-down direction, and wherein an output shaft of the steering actuator is fitted in the fitting recess of the first protruding portion, and a main body of the steering actuator is attached to the other of the suspension arm and the wheel support member.

The output shaft of the steering actuator is fitted in the fitting recess of the first protrusion, so that the output shaft of the steering actuator is held by one of the suspension arm and the wheel support member, so as to be rotatable integrally with the one of the suspension arm and the wheel support member. The main body of the steering actuator is attached to the other of the suspension arm and the wheel support member, so that the main body is held so as to be rotatable integrally with the other of the suspension arm and the wheel support member. Thus, the axis extending generally in the up-down direction may be referred to as a steering axis or a kingpin axis.

(7) The wheel-side device according to any one of the forms (1)-(6), further including a cover provided around the constant velocity joint to suppress evaporation of grease.

(8) The wheel-side device according to any one of the forms (1)-(7), wherein the wheel support member includes a thermal plate provided on a wheel holding portion that rotatably holds the wheel via a bearing, and wherein the suspension arm is provided with a heating portion configured to heat the thermal plate.

The heating portion may include a heater that directly heats the thermal plate or may include a heat transfer portion including one or more heat transfer members that transfer heat of a high-temperature portion to the thermal plate.

(9) The wheel-side device according to the form (8), wherein the heating portion includes a heat transfer portion configured to transfer heat of a high-temperature portion of the suspension arm to the thermal plate, wherein the heat transfer portion includes one or more heat transfer members provided between the high-temperature portion and the thermal heat plate, and wherein at least one of the one or more heat transfer members has flexibility.

The heat transfer member is preferably made of a member whose thermal conductivity is higher than 100 W/mK, a member whose thermal conductivity is higher than 150 W/mK, or a member whose thermal conductivity is higher than 200 W/mK, such as aluminum, zinc, copper, or brass.

The high-temperature portion is a portion of the suspension arm having a high temperature and may be a portion heated by the drive actuator, for instance.

(10) The wheel-side device according to any one of the forms (1)-(9), wherein the suspension arm is a leading arm or a trailing arm which is held by the body-side member at one end portion of the leading arm or the trailing arm located rearward or frontward of the wheel so as to be swingable about an axis extending generally in a width direction of the vehicle and which is connected to the wheel support member at the other end portion of the leading arm or the trailing arm so as to be rotatable about an axis extending in an up-down direction, and wherein the drive mechanism is provided at the other end portion.

The suspension arm swingably held by the body-side member at the rear of the wheel (in a case where the wheel is located forward of the swing shaft of the suspension arm) is referred to as a leading arm, and the suspension arm swingably held by the body-side member at the front of the wheel (in a case where the wheel is located rearward of the swing shaft of the suspension arm) is referred to as a trailing arm.

(11) A suspension device including a suspension arm connecting a wheel support member that supports a wheel of a vehicle and a body-side member of the vehicle, wherein the suspension arm is provided with a drive mechanism configured to rotationally drive the wheel, wherein the drive mechanism includes a drive actuator, and an output shaft of the drive actuator is connected to the wheel via a constant velocity joint, and wherein the constant velocity joint is located inside a connecting portion which is a portion where a part of the suspension arm and a part of the wheel support member are superposed on and connected to each other.

The suspension device according to this form may employ the technical features according to any one of the forms (1) through (10).

What is claimed is:

1. A wheel-side device provided for each of a plurality of wheels of a vehicle, comprising:
   a drive mechanism provided on a suspension arm connecting a wheel support member that supports the wheel and a body-side member of the vehicle and including a drive actuator, an output shaft of the drive actuator being connected to the wheel via a constant velocity joint to rotationally drive the wheel; and
   a steering actuator provided between the suspension arm and the wheel support member without a link member interposed therebetween and configured to steer the wheel;
   wherein a part of the suspension arm and a part of the wheel support member are superposed on and connected to each other so as to be rotatable relative to each other about an axis extending generally in an up-down direction; and
   wherein the constant velocity joint is located inside a connecting portion which is a portion where the part of the suspension arm and the part of the wheel support member are superposed on and connected to each other.

2. The wheel-side device according to claim 1, wherein an output shaft of the steering actuator is attached to one of the suspension arm and the wheel support member so as to be rotatable integrally with the one of the suspension arm and the wheel support member, and wherein a main body of the steering actuator is attached to the other of the suspension arm and the wheel support member so as to be rotatable integrally with the other of the suspension arm and the wheel support member.

3. The wheel-side device according to claim 1, wherein one of the suspension arm and the wheel support member includes a first protruding portion having a fitting recess and a second protruding portion located on an axis passing through the first protruding portion and extending generally in an up-down direction, and wherein the other of the suspension arm and the wheel support member includes: a cutout having a generally circular shape; and a holding portion having an engagement recess located on an axis passing through the cutout and extending generally in the up-down direction, the engagement recess being engageable with the second protruding portion.

4. The wheel-side device according to claim 3, wherein, in a state in which the second protruding portion is held by the holding portion while engaged with the engagement recess and the first protruding portion is fitted in the cutout, the suspension arm and the wheel support member are connected so as to be rotatable relative to each other about the axis extending generally in the up-down direction, and wherein an output shaft of the steering actuator is fitted in the fitting recess of the first protruding portion, and a main body of the steering actuator is attached to the other of the suspension arm and the wheel support member.

5. The wheel-side device according to claim 1,
wherein the wheel support member includes a thermal plate provided on a wheel holding portion that rotatably holds the wheel via a bearing, and
wherein the suspension arm is provided with a heating portion configured to heat the thermal plate.

6. A suspension device comprising a suspension arm connecting a wheel support member that supports a wheel of a vehicle and a body-side member of the vehicle,
wherein the suspension arm is provided with a drive mechanism configured to rotationally drive the wheel,
wherein the drive mechanism includes a drive actuator, and an output shaft of the drive actuator is connected to the wheel via a constant velocity joint, and
wherein the constant velocity joint is located inside a connecting portion which is a portion where a part of the suspension arm and a part of the wheel support member are superposed on and connected to each other.

7. A wheel-side device provided for each of a plurality of wheels of a vehicle, comprising:
a drive mechanism provided on a suspension arm connecting a wheel support member that supports the wheel and a body-side member of the vehicle and including a drive actuator, an output shaft of the drive actuator being connected to the wheel via a constant velocity joint to rotationally drive the wheel; and
a steering actuator provided between the suspension arm and the wheel support member without a link member interposed therebetween and configured to steer the wheel;
wherein one of the suspension arm and the wheel support member includes a first protruding portion having a fitting recess and a second protruding portion located on an axis passing through the first protruding portion and extending generally in an up-down direction, and
wherein the other of the suspension arm and the wheel support member includes: a cutout having a generally circular shape; and a holding portion having an engagement recess located on an axis passing through the cutout and extending generally in the up-down direction, the engagement recess being engageable with the second protruding portion.

8. The wheel-side device according to claim 7,
wherein, in a state in which the second protruding portion is held by the holding portion while engaged with the engagement recess and the first protruding portion is fitted in the cutout, the suspension arm and the wheel support member are connected so as to be rotatable relative to each other about the axis extending generally in the up-down direction, and
wherein an output shaft of the steering actuator is fitted in the fitting recess of the first protruding portion, and a main body of the steering actuator is attached to the other of the suspension arm and the wheel support member.

9. A wheel-side device provided for each of a plurality of wheels of a vehicle, comprising:
a drive mechanism provided on a suspension arm connecting a wheel support member that supports the wheel and a body-side member of the vehicle and including a drive actuator, an output shaft of the drive actuator being connected to the wheel via a constant velocity joint to rotationally drive the wheel; and
a steering actuator provided between the suspension arm and the wheel support member without a link member interposed therebetween and configured to steer the wheel;
wherein the wheel support member includes a thermal plate provided on a wheel holding portion that rotatably holds the wheel via a bearing, and
wherein the suspension arm is provided with a heating portion configured to heat the thermal plate.

* * * * *